United States Patent
Shalev et al.

(10) Patent No.: US 12,175,428 B1
(45) Date of Patent: *Dec. 24, 2024

(54) SYSTEM AND METHOD FOR AGENTLESS APPLICATION INVENTORY DETECTION

(71) Applicant: Wiz, Inc., New York, NY (US)

(72) Inventors: Mattan Shalev, Tel Aviv (IL); Yaniv Shaked, Tel Aviv (IL); Gal Kozoshnik, Petah Tikva (IL); Omri Kornblau, Tel Aviv (IL); Roy Reznik, Tel Aviv (IL); Ami Luttwak, Binyamina (IL); Yinon Costica, Tel Aviv (IL)

(73) Assignee: Wiz, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/532,682

(22) Filed: Dec. 7, 2023

Related U.S. Application Data

(63) Continuation of application No. 18/459,329, filed on Aug. 31, 2023, now Pat. No. 11,875,306.

(51) Int. Cl.
*G06Q 10/0875* (2023.01)
*G06F 21/57* (2013.01)

(52) U.S. Cl.
CPC ........ *G06Q 10/0875* (2013.01); *G06F 21/57* (2013.01)

(58) Field of Classification Search
CPC ............................ G06Q 10/0875; G06F 21/57
USPC ......................................................... 700/107
See application file for complete search history.

(56) References Cited

U.S. PATENT DOCUMENTS

| | | | |
|---|---|---|---|
| 11,150,888 B2 | 10/2021 | Beard | |
| 11,875,306 B1* | 1/2024 | Shalev | G06Q 10/0875 |
| 2017/0372072 A1 | 12/2017 | Baset et al. | |
| 2020/0401701 A1* | 12/2020 | Canada | G06F 21/577 |
| 2022/0358023 A1 | 11/2022 | Moser et al. | |
| 2023/0072264 A1 | 3/2023 | Coccia | |
| 2023/0208880 A1 | 6/2023 | Schutt et al. | |

* cited by examiner

*Primary Examiner* — Michael J Brown
(74) *Attorney, Agent, or Firm* — M&B IP Analysts, LLC

(57) ABSTRACT

A system and method for agentless generation of a software bill of materials (SBOM) in a cloud computing environment is disclosed. The method includes: accessing a plurality of workloads in a cloud computing environment; detecting in each workload of the plurality of workloads a software component; generating for each workload an SBOM based on the detected software component; and storing each SBOM in a database.

25 Claims, 6 Drawing Sheets

SYSTEM AND METHOD FOR AGENTLESS APPLICATION INVENTORY DETECTION

CROSS-REFERENCE TO RELATED APPLICATION

This application is a continuation of U.S. patent application Ser. No. 18/459,329, filed on Aug. 31, 2023, the contents of which are hereby incorporated by reference.

TECHNICAL FIELD

The present disclosure relates generally to cybersecurity, and particularly to reducing cybersecurity threats by generating application inventory for cloud computing environments.

BACKGROUND

Cloud computing environments, and computing environments in general, are the backbone of almost any human activity today. Whether providing support for financial institutions, aviation data and information, entertainment, communication, data storage or so many more, computing environments are ubiquitous.

As they create value, so too do they attract malicious actors who wish to take that value for themselves. Valuable information, data, and computing resources such as processors and memory are ripe targets for attackers, and to thwart their efforts, the field of cybersecurity has emerged.

Often, software applications, cloud services, and the like, are found to have internal, often unintended, vulnerabilities, which may be exploited by a bad actor. A database of such vulnerabilities, for example, is implemented as the Common Vulnerabilities and Exposures (CVE) database. This allows to address known security flaws in computing environments in a standardized way.

However, knowing that a vulnerability or exposure exists for a particular software application is not enough, as organizations can have hundreds, thousands, and sometimes hundreds of thousands of computation devices, virtualizations, workloads, and the like, deployed therein. Therefore, an organization needs to know both that a vulnerability exists for a particular software, but also that the software does (or does not) exist in the organization's environment.

For this purpose, it is advantageous to have a software bill of materials (SBOM). An SBOM can contain software dependencies, libraries, software component identifiers, and so on. An up to date SBOM is therefore desirable, for at least this purpose.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, method may include accessing a plurality of workloads in a cloud computing environment. Method may also include detecting in each workload of the plurality of workloads a software component. Method may furthermore include generating for each workload an SBOM (software bill of materials) based on the detected software component. Method may in addition include storing each SBOM in a database. Other embodiments of this aspect include corresponding computer systems, apparatus, and computer programs recorded on one or more computer storage devices, each configured to perform the actions of the methods.

Implementations may include one or more of the following features. Method may include: detecting a cloud service in the cloud computing environment; and storing an identifier of the cloud service in an SBOM. Method may include: detecting a disk associated with a workload of the plurality of workloads; generating an inspectable disk based on the disk associated with the workload; and inspecting the inspectable disk for the software component. Method may include: generating the inspectable disk by any one of: cloning the disk associated with the workload, generating a snapshot of the disk associated with the workload, generating a copy of the disk associated with the workload, and a combination thereof. Method where the software component is any one of: a software application, a library, a binary, a dependency, a version setting, a registry file, a license, a vendor identifier, and any combination thereof. Method may include: generating a first SBOM for a first workload at a first time; and generating a second SBOM for the first workload at a second time. Method may include: detecting a difference between the second SBOM and the first SBOM; and storing the first SBOM and the detected difference in the database. Method may include: generating a mitigation action in response to detecting the difference. Method may include: generating a report based on the detected difference. Method may include: deleting the first SBOM from the database; and storing the second SBOM in place of the first SBOM in the database. Method may include: receiving an identifier of a software component; generating a query based on the received identifier; and executing the generated query on the database. Implementations of the described techniques may include hardware, a method or process, or a computer tangible medium.

In one general aspect, non-transitory computer-readable medium may include one or more instructions that, when executed by one or more processors of a device, cause the device to: access a plurality of workloads in a cloud computing environment. Medium may furthermore detect in each workload of the plurality of workloads a software component. Medium may in addition generate for each workload an SBOM based on the detected software component. Medium may moreover store each SBOM in a database. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: access a plurality of workloads in a cloud computing environment. System may in addition detect in each workload of the plurality of workloads a software component. System may moreover generate for each workload an SBOM based on the detected software component. System may also store each SBOM in a database. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: detect a cloud service in the cloud computing environment; and store an identifier of the cloud service in an SBOM. System where the memory contains further instructions which when executed by the processing circuitry further configure the system to: detect a disk associated with a workload of the plurality of workloads; generate an inspectable disk based on the disk associated with the workload; and inspect the inspectable disk for the software component. System where the memory contains further instructions which when executed by the processing circuitry further configure the system to: generate the inspectable disk by any one of: clone the disk associated with the workload, generating a snapshot of the disk associated with the workload, generating a copy of the disk associated with the workload, and a combination thereof. System where the software component is any one of: a software application, a library, a binary, a dependency, a version setting, a registry file, a license, a vendor identifier, and any combination thereof. System where the memory contains further instructions which when executed by the processing circuitry further configure the system to: generate a first SBOM for a first workload at a first time; and generate a second SBOM for the first workload at a second time. System where the memory contains further instructions which when executed by the processing circuitry further configure the system to: detect a difference between the second SBOM and the first SBOM; and store the first SBOM and the detected difference in the database. System where the memory contains further instructions which when executed by the processing circuitry further configure the system to: generate a mitigation action in response to detecting the difference. System where the memory contains further instructions which when executed by the processing circuitry further configure the system to: generate a report based on the detected difference. System where the memory contains further instructions which when executed by the processing circuitry further configure the system to: delete the first SBOM from the database; and store the second SBOM in place of the first SBOM in the database. System where the memory contains further instructions which when executed by the processing circuitry further configure the system to: receive an identifier of a software component; generate a query based on the received identifier; and execute the generated query on the database. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
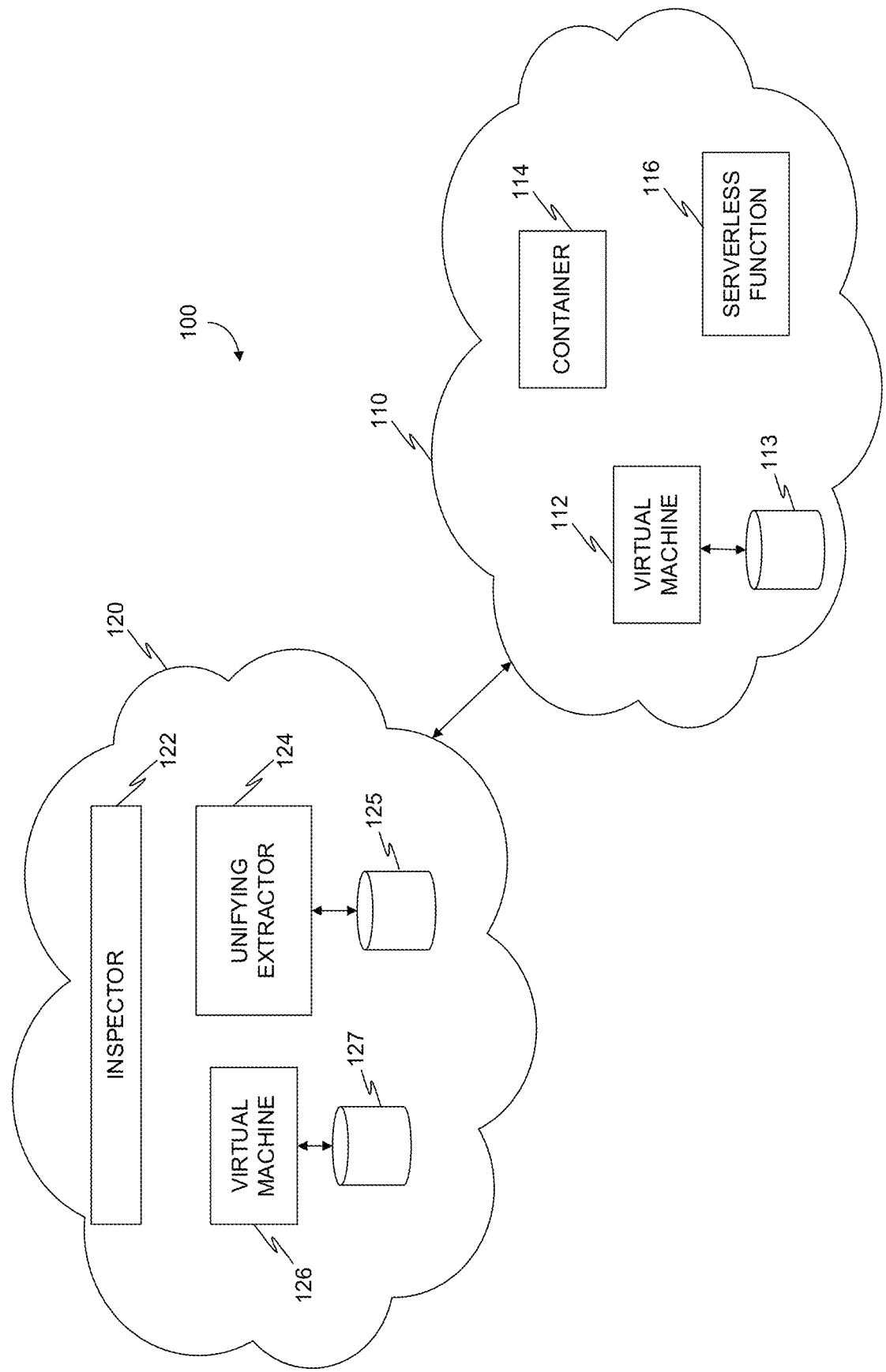
FIG. 1 is an example schematic illustration of a computing environment and an inspection environment, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating a software inventory of a computing environment. In some embodiments, the computing environment is a cloud computing environment, and the software inventory includes cloud entities, cloud services, applications, appliances, microservices, identities, combinations thereof, and the like.

In an embodiment, the inventory is a software bill-of-materials (SBOM) which is generated based on a predefined data schema, such as SPDX, CycloneDX, PCE, and the like. In some embodiments, a predefined data schema includes a plurality of data fields stored, for example, as a JSON file. This is advantageous as it allows to utilize a database management service to search for objects in the inventory.

In some embodiments, generating an inventory is performed utilizing an agentless method. An agentless method is advantageous over an agent-based method for example, as there is no need to have a persistent software executed on each and every workload deployed in a computing environment. Such an agent would require processor resources and memory resources, which come at the expense of the workload.

Furthermore, when a new workload is deployed in the environment, an agentless method does not require installing an agent on the new workload in order to generate the inventory.

In an embodiment, the inventory is generated by an inspector, an SBOM generator, and the like, which is configured to detect software components, metadata, identifiers, combinations thereof, and the like. For example, in an embodiment, an inspector is configured to detect a cybersecurity object on a workload, and is further configured to detect a software component on the workload. In some embodiments, the workload is a virtual machine, a software container, a serverless function, a combination thereof, and the like.

According to an embodiment, generating the inventory by an inspector is advantageous, for example, where inspection is performed by generating a clone of a disk in a computing environment into an inspectable disk. As explained in more detail below, cloning a disk in order to perform an inspection and generate an inventory is advantageous as a cloned disk is immediately available, as opposed to a disk snapshot which must be completed prior to the snapshot being accessed. Therefore, generation of the inventory is performed faster, since there is no need to wait for all contents of the disk to be copied.

Furthermore, according to some embodiments, generating a clone of a disk reduces a total number of IOPS (I/O operations per second) in a cloud computing environment. This is due to the contents of a disk being copied into a clone offline, while access is provided to the contents of the cloned disk immediately by way of providing a pointer of the cloned disk to the contents of the original disk. Therefore, where inspection is performed prior to the disk being copied, the cloned disk can be released, and the storage resources need not be allocated to it.

In certain embodiments, an SBOM is generated periodically, and includes a version number (e.g., a timestamp). In some embodiments, an entire SBOM is stored on a database. In an embodiment, an SBOM is generated at a first time and stored on a database, and a second SBOM is generated at a second time. In some embodiments, a diff is generated between the second SBOM and the first SBOM, such that the diff includes identifiers, metadata, and the like which is detected on the second SBOM, and not detected on the first SBOM.

In such embodiments, the first SBOM is stored, and the diff between the second SBOM and the first SBOM is stored, thus negating the need to store the second SBOM in its entirety.

FIG. 1 is an example schematic illustration 100 of a computing environment and an inspection environment, utilized to describe an embodiment. In an embodiment, a cloud computing environment 110 is implemented as, for example, a virtual private cloud (VPC), a virtual network (VNet), combinations thereof, and the like. In certain embodiments, the cloud computing environment is deployed on a cloud computing infrastructure. Examples of cloud computing infrastructures include Amazon® Web Services (AWS), Google® Cloud Platform (GCP), Microsoft® Azure, and the like. In certain embodiments, the computing environment 110 is a hybrid environment, including a cloud computing environment and a local networked computing environment.

In an embodiment, the cloud computing environment 110 includes a plurality of resources and principals. In certain embodiments, a resource is an entity in a computing environment, and is, for example, a virtual machine, a bare metal machine, a software container, a serverless function, a cloud service, a provisioned computational resource (e.g., a processor, a memory, a storage, a combination thereof, and the like), a workload, a combination thereof, and the like.

In some embodiments, a principal is an entity in a computing environment which is authorized to initiate an action in the computing environment, act on a resource, assume a role of another principal, a combination thereof, and the like. In an embodiment, a principal is, for example, a user account, a service account, a role, a combination thereof, and the like.

For example, in an embodiment, the cloud computing environment 110 includes a virtual machine 112, a software container 114, and a serverless function 116. In some embodiments, a serverless function 116 is implemented as an Amazon® Lambda. In an embodiment, a software container 114 is implemented utilizing a Docker® engine, a Kubernetes® platform, combinations thereof, and the like.

In an embodiment, the virtual machine 112 is implemented utilizing Oracle® VirtualBox®. In certain embodiments, the virtual machine 112 is provisioned a disk 113, for example by provisioning physical storage addresses and mapping each physical storage address to a virtual storage address, and provisioning the virtual storage addresses to the virtual machine 112. In some embodiments, a virtual machine 112 is provisioned with a plurality of disks.

In certain embodiments, the cloud computing environment 110 is monitored by an inspection environment 120, configured to detect cybersecurity objects, cybersecurity threats, vulnerabilities, exposures, misconfigurations, combinations thereof, and the like. In an embodiment, the inspection environment 120 is further configured to detect software components, such as a software application, a library, a binary, a binary version, a dependency, a version setting, a registry file, a license, a vendor identifier, an operating system (OS) package, an open-source library, a combination thereof, and the like.

In an embodiment, the inspection environment 120 is implemented as a cloud computing environment. In some embodiments, the inspection environment 120, a portion thereof, and the like, are implemented in the cloud computing environment 110.

In some embodiments, the inspection environment 120 includes an inspector 122, a unifying extractor 124, and a workload, such as virtual machine 126. In some embodiments, the inspector 122 is implemented as a workload, a plurality of workloads, and the like, which are configured to detect a cybersecurity object, a cybersecurity threat, a vulnerability, an exposure, a misconfiguration, a software component, a software application, a library, a binary, a binary version, a dependency, a version setting, a registry file, a license, a vendor identifier, an operating system (OS) package, an open source library, a combination thereof, and the like.

In an embodiment, a unifying extractor 124 is configured to extract, from each of a plurality of workloads, cybersecurity objects and the like, for inspection by an inspector. In some embodiments, the plurality of workloads include a virtual machine, a software container, a serverless function, a combination thereof, and the like. In some embodiments, the unifying extractor 124 is configured to extract data from a workload, and store the data, for example based on a predefined data schema, in a database 125.

In some embodiments, the database 125 is implemented as a graph database. In such embodiments, the data schema incudes, for example, a data schema, a data template, and the like, for various entities in a computing environment. For example, in an embodiment, a data schema includes a data template, based on a which a representation is generated in the database 125 of an entity deployed in the cloud computing environment 110.

In some embodiments, the database 125 is a graph database, such as Neo4j®, and entities, such as resources, principals, and the like, are represented as nodes in the graph database. This is advantageous, as having a unified data template, data schema, and the like, to represent various cloud computing environments, allows a more compact representation. For example, there is no need to store a first data template for a virtual machine, and a second data template for a serverless function, when instead a single data template is utilized for representing a resource.

Furthermore, in certain embodiments, where multiple cloud computing environments are deployed and represented, having a single data schema used to represent each different cloud computing environment (e.g., AWS, GCP, etc.) is advantageous likewise. This reduces the amount of data schemas, data templates, and the like, required to represent a computing environment, and further allows to manipulate such representations using a unified instruction, as opposed to requiring generating different instructions for different types of data structures.

In some embodiments, a data template, data schema, and the like, includes a plurality of data fields. Each data field is populated with data (i.e., data values), according to an embodiment, extracted for example by a unifying extractor 124.

In some embodiments, a virtual machine 126 (or other workload) is spun up, provisioned, and the like. In certain embodiments, the virtual machine 126 is assigned a disk 127. In an embodiment, the disk 127 is an inspectable disk. In certain embodiments, the disk is generated by cloning the disk 113 of the virtual machine 112 in the cloud computing environment 110.

For example, in an embodiment, a clone of the disk 113 is generated as a disk 127 in an inspection environment 120, in the cloud computing environment 110, and the like. In some embodiments, an inspectable disk 127 is generated utilizing a snapshot, a disk copy, a disk clone, a combination thereof, and the like. In some embodiments, disk cloning is advantageous as cloning a disk utilizes less computational resources than, for example, generating a snapshot. For example, under some cloud infrastructure platforms, such as Microsoft® Azure, generating a snapshot requires storing the snapshot in a storage of the cloud computing environment. However, in an embodiment, generating a disk clone generates a pointer that points to the same data, therefore data is not duplicated, requiring less storage.

In an embodiment, the inspector 122 is configured to inspect the inspectable disk 127 for a cybersecurity object, a cybersecurity threat, a vulnerability, an exposure, a misconfiguration, a software component, a software application, a library, a binary, a binary version, a dependency, a version setting, a registry file, a license, a vendor identifier, an operating system (OS) package, an open source library, a combination thereof, and the like.

Figure 2:
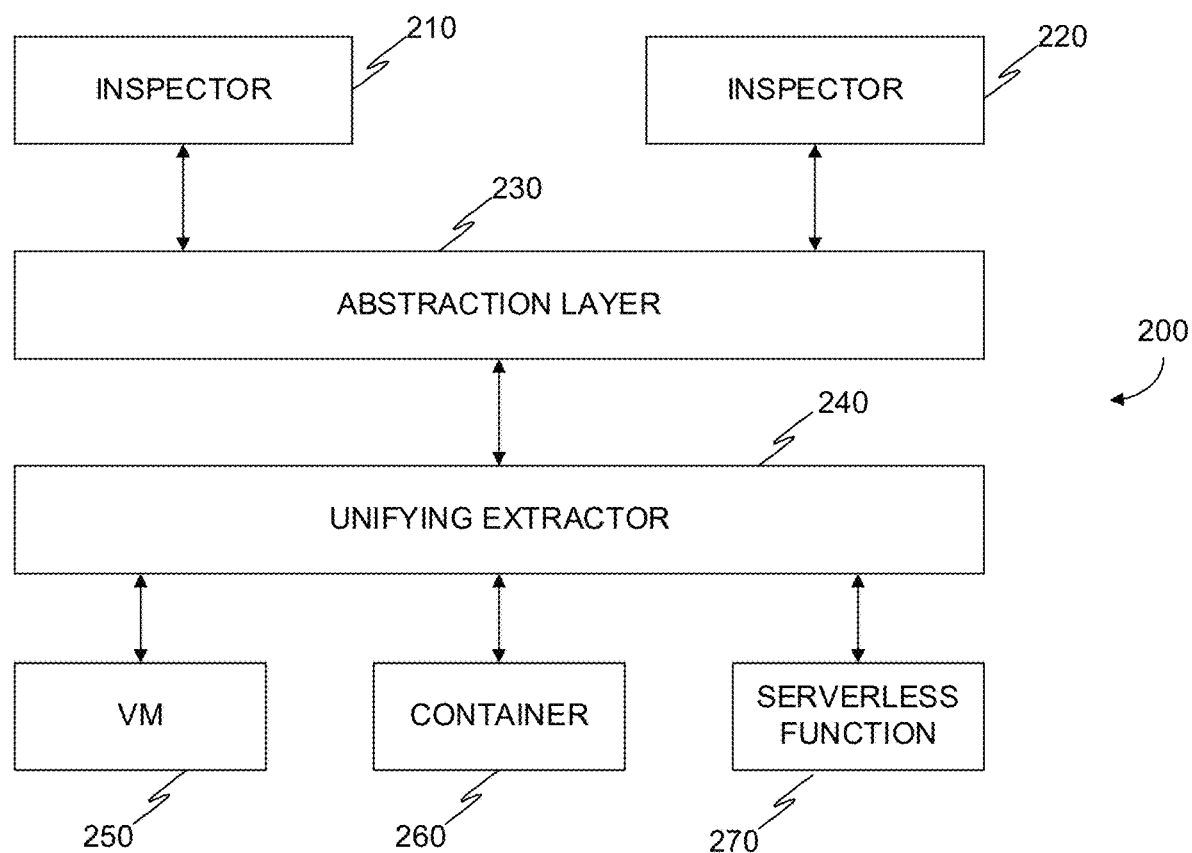
FIG. 2 is an example schematic illustration of a software component inspector, implemented in accordance with an embodiment.

FIG. 2 is an example schematic illustration 200 of a software component inspector, implemented in accordance with an embodiment. In some embodiments, the inspector is a unified inspector, configured to inspect multiple types of workloads.

In an embodiment, a unifying extractor 240 is configured to access a plurality of resources. In some embodiments, the unifying extractor 240 is configured to read data from a virtual machine 250, a software container 260, a serverless function 270, a combination thereof, and the like. In certain embodiments, the unifying extractor 240 is configured to extract data from various workloads, and store the extracted data in an abstraction layer 230.

In some embodiments, the abstraction layer 230 is generated based on a data schema, a data template, a combination thereof, and the like. For example, in an embodiment, the abstraction layer 230 includes data extracted from a plurality of different resources, stored based on a shared data schema, for example stored in a database, such as a graph database.

In certain embodiments, a plurality of inspectors, such as inspector 210 and inspector 220, are configured to read data from the abstraction layer 230, and detect a predefined object, a predefined code, a predefined software component, a combination thereof, and the like.

In an embodiment, an inspector, such as inspector 210, is configured to inspect the abstraction layer 230, an inspectable disk, a combination thereof, and the like. In some embodiments, the inspector 210 is configured to inspect an inspectable disk, such as a disk generated from a clone of an original disk, wherein the original disk is deployed in a cloud computing environment.

In some embodiments, the inspector 210 is configured to detect various software components, for example such as detailed above, and store an identifier for each software component. In an embodiment, the identifier of each software component is stored together with an identifier of the workload, in a database, in an abstraction layer 230, a combination thereof, and the like.

In certain embodiments, a plurality of identifiers, each identifier corresponding to a software component, is utilized to generate a software bill-of-materials (SBOM). In some embodiments, the plurality of identifiers are stored in a standard format, such as SPDX, CycloneDX, CPE, and the like. In certain embodiments, the standard format is expressed in a JSON data schema, XML data schema, a protocol buffer, combinations thereof, and the like.

In an embodiment, the SBOM further includes cloud services, microservices, appliances, applications, code objects, infrastructure as code files, orchestration instructions, combinations thereof, and the like, which are detected, for example by an inspector configured to so detect, in the cloud computing environment.

Figure 3:
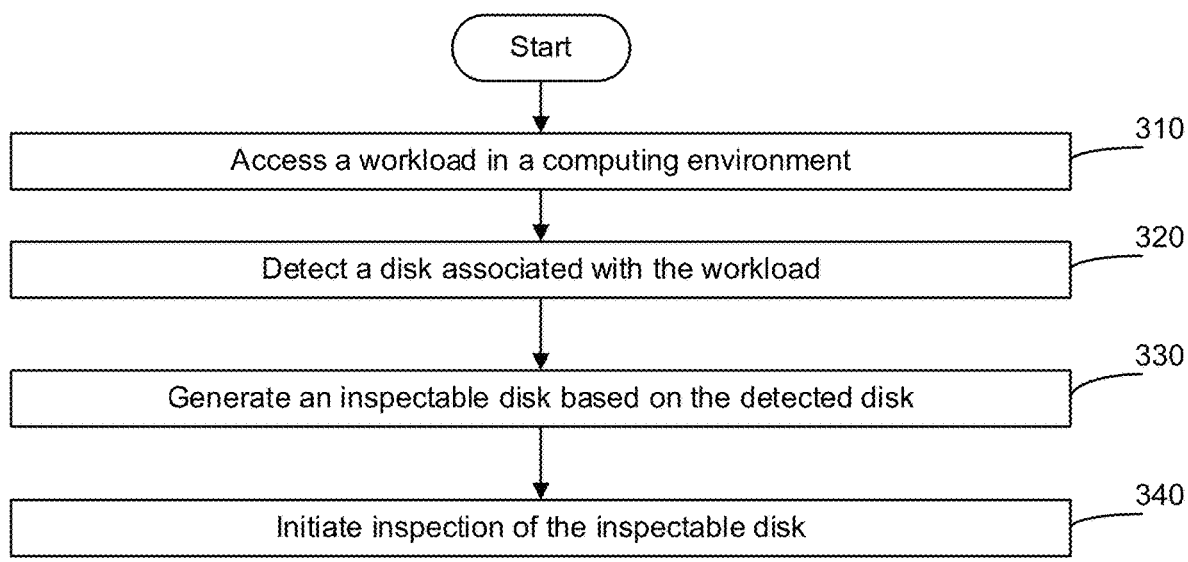
FIG. 3 is an example flowchart of a method for inspecting a disk of a workload deployed in a cloud computing environment, implemented in accordance with an embodiment.

FIG. 3 is an example flowchart of a method for inspecting a disk of a workload deployed in a cloud computing environment, implemented in accordance with an embodiment.

At S310, a workload is accessed. In an embodiment, the workload is deployed in a computing environment. In some embodiments, a plurality of workloads are deployed in a computing environment. In an embodiment, the computing environment is a cloud computing environment, deployed on a cloud computing infrastructure, an on-premises environment deployed as a physical network, a hybrid computing environment, a combination thereof, and the like.

In certain embodiments, a workload is a resource deployed in a cloud computing environment. For example, according to an embodiment, a workload is a virtual machine, software container, a serverless function, a combination thereof, and the like.

In some embodiments, an inspection controller is configured to initiate accessing of a workload. In certain embodiments, an inspection controller is a workload configured to assume a role, a service account, and the like, in a computing environment in which the accessed workload is deployed.

At S320, a disk is detected. In an embodiment, the disk is detected by accessing the workload, and determining that the workload is provisioned a disk. For example, in an embodiment, a software container is provisioned a disk by generating a persistent volume claim (PVC). In an embodiment, in response to receiving a PVC, a software container provisions storage, for example by generating a persistent volume (PV) and assigning the PV.

In an embodiment, a disk is associated with a virtual machine. In certain embodiments, a disk associated with a virtual machine includes a plurality of virtual addresses, each address mapped to a physical address, for example of a block storage. In some embodiments, multiple layers of virtualization are utilized, such that a first virtual address is directed to a second virtual address, and so on, until a penultimate virtual address is directed to a physical address.

At S330, an inspectable disk is generated. In an embodiment, the inspectable disk is generated based on the detected disk. In some embodiments, the inspectable disk is generated in the same computing environment as the detected disk. In certain embodiments, the inspectable disk is generated in a different computing environment as the detected disk.

In an embodiment, the inspectable disk is generated by initiating a cloning of the detected disk. For example, in an embodiment, a disk clone is initiated by executing an instruction in a cloud computing environment which generates a pointer that points to the original disk.

In some embodiments, the cloud computing environment, cloud computing infrastructure, and the like, is configured to copy the contents of the detected disk into the cloned disk at a later time than a time when the cloned disk is initiated. In order to provide immediate access to the data, the pointer is generated, which allows access to the cloned disk, according to an embodiment.

In certain embodiments, once all data is copied to the cloned disk, the pointer is reconfigured to point to the copied disk, which is now the cloned disk. However, according to an embodiment, inspection of the cloned disk is performed prior to copying being finished, thus allowing to release the resources of the copied disk.

At S340, inspection is initiated. In an embodiment, inspection is initiated for the inspectable disk. In some embodiments, the inspectable disk is inspected by an inspector, configured to detect a cybersecurity object, a cybersecurity threat, a vulnerability, an exposure, a misconfiguration, a software component, a software application, a library, a binary, a binary version, a dependency, a version setting, a registry file, a license, a vendor identifier, an operating system (OS) package, an open source library, a combination thereof, and the like.

In some embodiments, a cybersecurity object is, for example, a hash, a code object, a password, a certificate, a cryptographic key, a signature generated based on software code, a combination thereof, and the like.

In certain embodiments, inspection of the inspectable disk includes detecting identifiers, metadata, and the like, of software components. In some embodiments, an identifier, metadata, a combination thereof, and the like, is stored based on a predefined data schema (e.g., SPDX) to generate an SBOM, a software inventory, a combination thereof, and the like.

Figure 4:
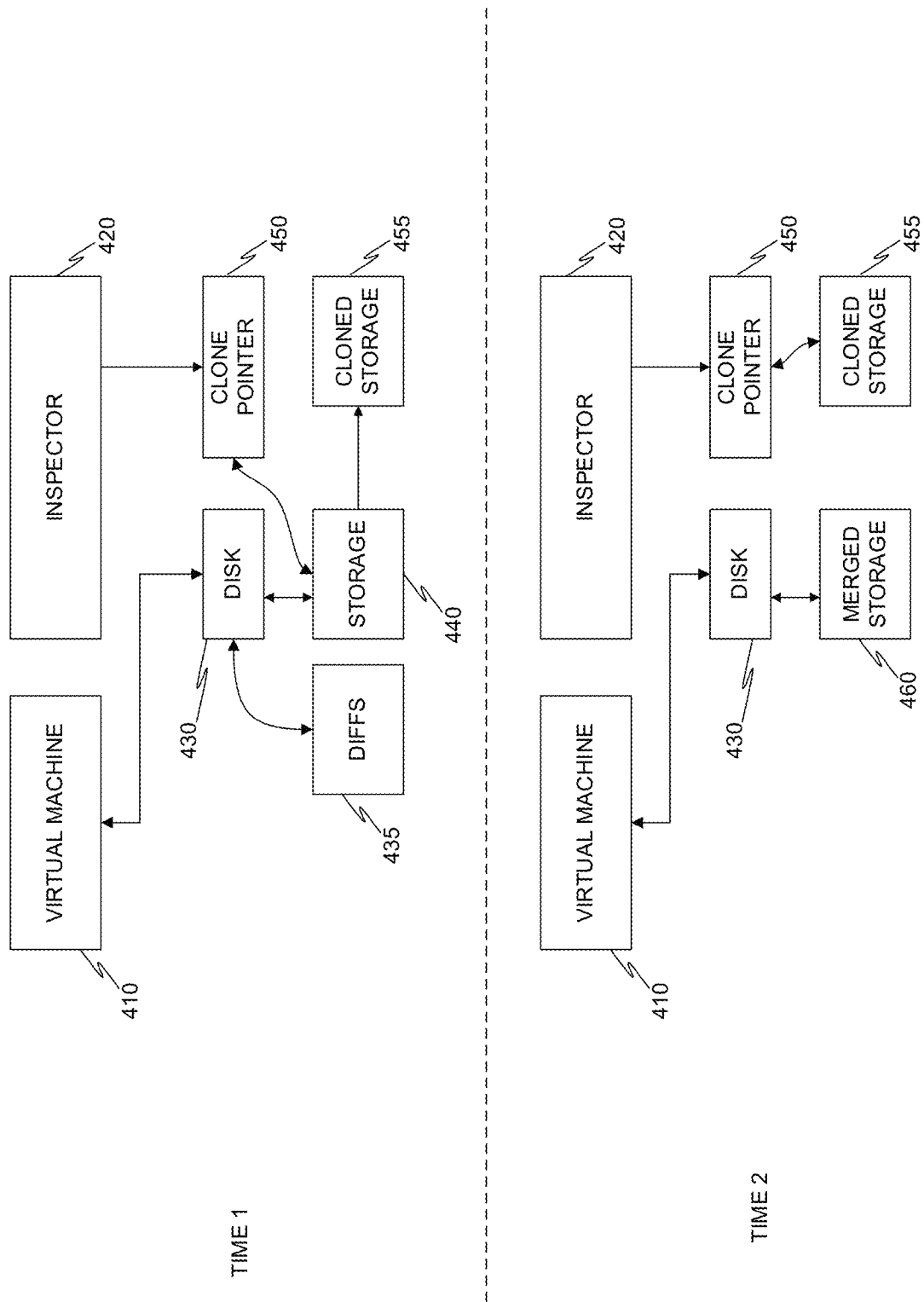
FIG. 4 is an example timeline diagram of an inspectable disk generation utilizing disk cloning, utilized to describe an embodiment.

FIG. 4 is an example timeline diagram of an inspectable disk generation utilizing disk cloning, utilized to describe an embodiment. According to an embodiment, at a first time (Time 1), a disk 430 is cloned. In an embodiment, the disk 430 is associated, provisioned, and the like to a virtual machine 410. In some embodiments, the virtual machine 410 is deployed in a cloud computing environment.

In certain embodiments, the disk 430 includes a plurality of virtual addresses, such that each virtual address is assigned a physical address, such as directed to a physical storage block, of a storage 440.

In an embodiment, a cloned disk is generated by generating a pointer 450, which points to a storage address of the storage 440. By pointing the pointer 450 to the storage 440, the cloned disk is immediately accessible.

In an embodiment, the virtual machine 410 is configured to continuously write to the disk 430. In such embodiments, the disk 430 is configured to store certain disk operations, such as disk writes as diffs (i.e., differences) in a diff storage 435.

This is advantageous as it allows the virtual machine 410 to continuously write and otherwise access the disk, while also maintaining data at a point in time (i.e., Time 1) when the disk 430 was cloned. In other words, according to an embodiment, when an inspector 420 is configured to inspect the cloned disk, the inspector 420 is configured to access the cloned disk through the clone pointer 450, which allows access to data which was present on the disk at the time of the cloning.

However, when the virtual machine 410 accesses the disk 430, the virtual machine also accesses the diff storage 435, which allows the virtual machine 410 to always view the up to date data on the disk 430.

In certain embodiments, the data stored on the disk 430 at the time (Time 1) of cloning is copied into a cloned storage 455. In some embodiments, copying the data occurs over a period of time. This is advantageous as it allows, for example, the cloud computing environment to distribute IOPS (I/O operations per second) over time, which is especially advantageous where certain cloud computing infrastructures include an IOPS limit.

Therefore, according to an embodiment, at a second point in time (Time 2), the clone pointer 450 points to a cloned storage 455. In certain embodiments, the clone pointer 450 is configured to point to the cloned storage 455 once all data from the disk 430 at the first time (Time 1) is cloned into the cloned storage 455.

In certain embodiments, once cloning is complete, the storage 440 and diff storage 435 are merged to a merged storage 460. At this point in time the cloned storage 455 and the merged storage 460 are completely separated from each other.

Disk cloning is advantageous as it allows the inspector to inspect a cloned disk through the cloned pointer 450, while the data from the original disk 430 is still being copied to the actual cloned disk. In an embodiment, where inspection concludes prior to the second time (Time 2), the cloned disk is released. This allows reducing IOPS, by not having to copy the entire contents of the original disk 430.

Figure 5:
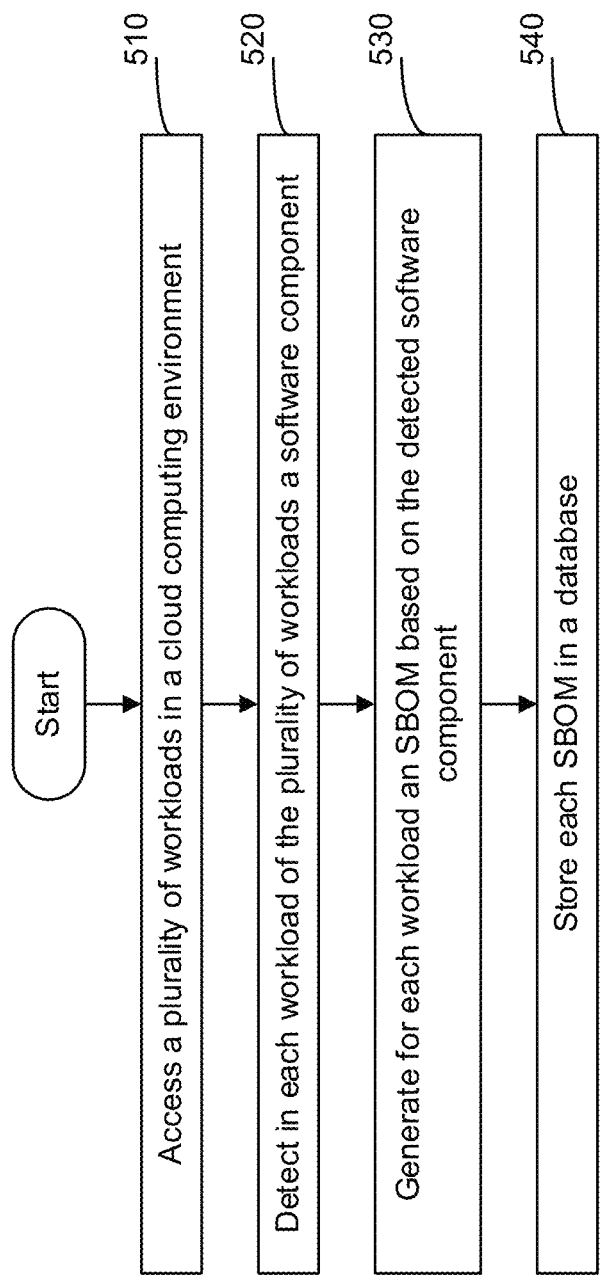
FIG. 5 is an example flowchart of a method for generating a software application inventory, implemented in accordance with an embodiment.

FIG. 5 is an example flowchart of a method for generating a software application inventory, implemented in accordance with an embodiment.

At S510, a plurality of workloads are accessed. In an embodiment, the plurality of workloads are deployed in a cloud computing environment, in an on-premises environment, in a hybrid environment, in a combination thereof, and the like.

In certain embodiments, a workload is a resource, such as a virtual machine, a software container, a serverless function, a combination thereof, and the like.

In an embodiment, accessing a workload includes initiating inspection of the workload. For example, according to an embodiment, initiating inspection of a workload includes generating an inspectable disk based on a disk, a storage, a combination thereof, and the like.

In an embodiment, the disk includes storage provisioned to the workload, such as a storage addresses assigned to a virtual machine, a persistent volume assigned by utilizing a persistent volume claim of a software container, combinations thereof, and the like.

In some embodiments, each workload of the plurality of workloads is accessed, for example periodically. In certain embodiments, the workloads are accessed based on predefined time intervals (e.g., every hour, every 12 hours, once per day, etc.).

At S520, a software component is detected. In an embodiment, the software component is any one of: a software application, a library, a binary, a binary version, a dependency, a version setting, a registry file, a license, a vendor identifier, an operating system (OS) package, an open source library, a combination thereof, and the like.

In some embodiments, metadata of the software component is further detected. Metadata is, according to an embodiment, a version identifier, a source identifier, an author identifier, a combination thereof, and the like.

According to an embodiment, a software component is detected by an inspector configured to detect a particular software component, a plurality of software components, a cybersecurity object, a cybersecurity threat, combinations thereof, and the like.

In certain embodiments, an inspector is configured to detect a predetermined type of software component (e.g., operating system). In other embodiments, an inspector is configured to detect a predetermined type of software component (e.g., operating system) from a predetermined type of workload (e.g., virtual machine).

At S530, an inventory is generated. In an embodiment, the inventory is an SBOM (i.e., software bill-of-materials). In some embodiments, the SBOM is stored based on a predetermined data schema, for example based on a JSON data schema, an XML data schema, and the like. In certain embodiments, the data schema is specified by a standard such as SPDX, CycloneDX, PDE, and the like.

In some embodiments, the inventory, SBOM, and the like, is stored on a database. In certain embodiments, the database is a columnar database, relational database, and the like. In an embodiment, an inspector is further configured to detect cloud entities, identities, cloud services, combinations thereof, metadata thereof, and the like. In such embodiments, the SBOM further includes findings generated based on the inspector detection.

In an embodiment, the inventory includes a version number. For example, in some embodiments, the version number is a timestamp. In some embodiments, an SBOM, inventory, and the like, is generated at a first time and at a second time which is after the first time. In some embodiments, an SBOM diff is stored, which includes findings (e.g., software components) detected at the second time and not detected at the first time.

This is advantageous, according to an embodiment, as it allows to reduce the amount of storage required to store the information generated from a plurality of SBOM inspections. Duplicated data, for example, is therefore stored only once, according to an embodiment.

In some embodiments, an SBOM diff includes a version number, such as a timestamp. In some embodiments, an SBOM is generated at a first time, an SBOM diff is generated at a second time (after the first time), and another SBOM is generated at a third time (after the second time). In certain embodiments, storage of the SBOM alternates between storing an entire SBOM at a time interval, and storing a diff at a later time interval.

According to an embodiment, the SBOM is stored in a searchable database. In some embodiments, the database includes a control. In an embodiment, a control is a predefined policy, query, combination thereof, and the like. For example, in an embodiment, a control includes a query to detect a predetermined software component type. In an embodiment, a policy is applied on the query, such that when the query is executed on the database storing thereon the SBOM, and a result returns as true (or returns as a value other than false, null, and the like), then an action is initiated.

In an embodiment, the action is a mitigation action. For example, according to an embodiment, a mitigation action includes generating a notification, isolating a workload corresponding to an identifier received as a result of executing the query, sandboxing a workload, revoking access to a workload, revoking access from a workload, a combination thereof, and the like. In some embodiments, the mitigation action includes generating an alert, generating a severity score for an alert, updating a severity score for an existing alert, and the like.

In certain embodiments, the SBOM database is periodically queried based on queries generated from a vulnerability database, such as the Common Vulnerabilities and Exposure (CVE) database. For example, in an embodiment, a CVE entry includes a software identifier. In an embodiment, the software identifier of the CVE entry is utilized in a query directed at a database storing thereon an SBOM of a cloud computing environment.

In certain embodiments, the query is configured to return as a result an identifier of a workload having deployed thereon a software component corresponding to the software identifier of the CVE entry. This is advantageous as it allows to detect cybersecurity threats in an efficient manner.

Furthermore, having an up to date SBOM allows to provide compliance to certain requirements. For example, a government requiring a vendor to show an SBOM in order to enhance security of a software supply chain is beneficial, as it allows to rapidly respond to incidents such as the SolarWinds® hack of 2019.

Figure 6:
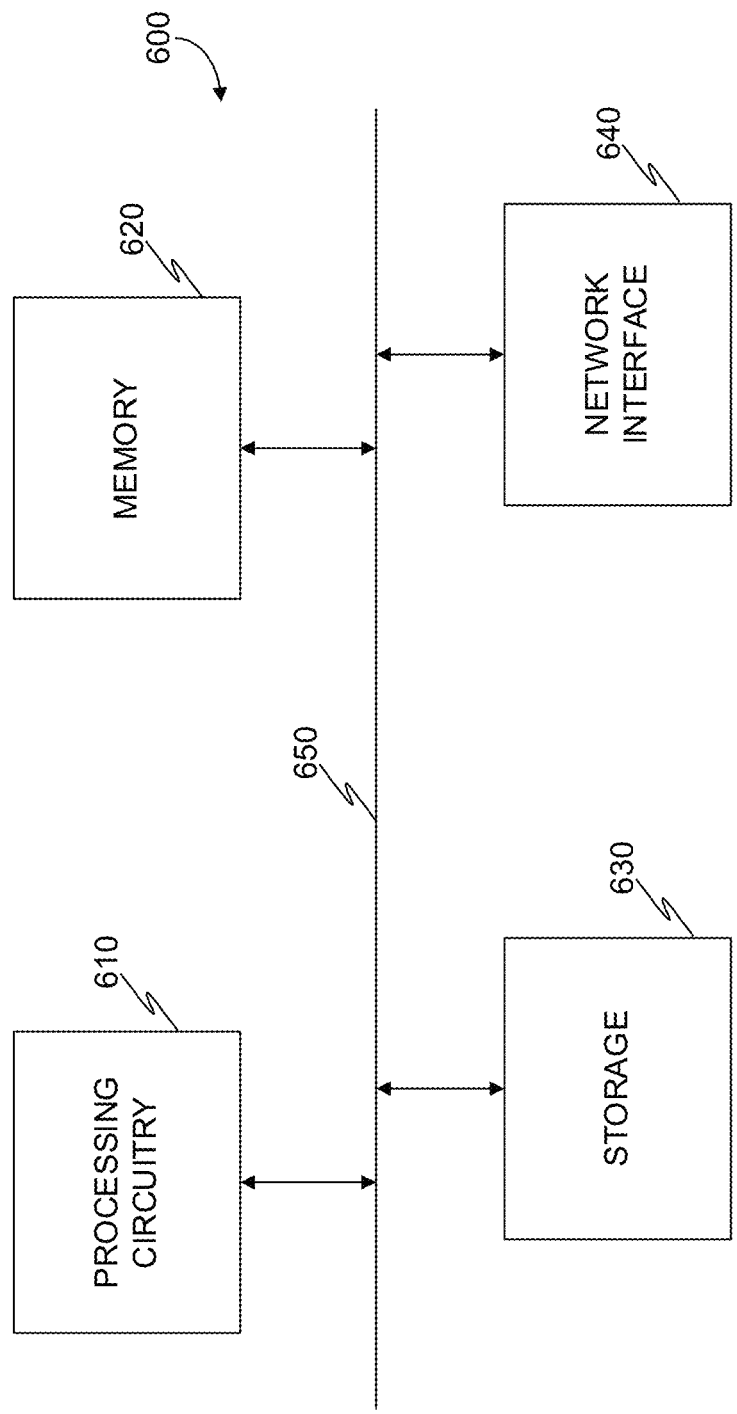
FIG. 6 is an example schematic diagram of an SBOM generator according to an embodiment.

FIG. 6 is an example schematic diagram of an SBOM generator according to an embodiment. In an embodiment, the SBOM generator 600 is implemented as an inspector workload, such as detailed above. In an embodiment, the SBOM generator 600 is configured to generate an inventory, an SBOM, and the like.

The SBOM generator 600 includes a processing circuitry 610 coupled to a memory 620, a storage 630, and a network interface 640. In an embodiment, the components of the SBOM generator 600 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the SBOM generator 600 with communication with, for example, an inspector 122, a virtual machine 126, a database 125, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for agentless generation of a software bill of materials (SBOM) in a computing environment, comprising:
   generating an inspectable disk based on a disk deployed in a computing environment;
   inspecting the inspectable disk for a software component;
   detecting the software component in the inspectable disk;
   generating an SBOM based on the detected software component; and
   storing the SBOM in a database.

2. The method of claim 1, further comprising:
   detecting a cloud service in the computing environment, wherein the computing environment is a cloud computing environment; and
   storing an identifier of the cloud service in the SBOM.

3. The method of claim 1, further comprising:
   detecting a workload associated with the disk in the computing environment.

4. The method of claim 1, further comprising:
   generating the inspectable disk by cloning the disk deployed in the computing environment.

5. The method of claim 1, further comprising:
   generating the inspectable disk based on a snapshot of the disk.

6. The method of claim 1, further comprising:
   generating the inspectable disk based on a copy of the disk.

7. The method of claim 1, wherein the software component is any one of: a software application, a library, a binary, a dependency, a version setting, a registry file, a license, a vendor identifier, and any combination thereof.

8. The method of claim 1, further comprising:
   generating a first SBOM at a first time; and
   generating a second SBOM at a second time.

9. The method of claim 8, further comprising:
   detecting a difference between the second SBOM and the first SBOM; and
   storing the first SBOM and the detected difference in the database.

10. The method of claim 9, further comprising:
    initiating a mitigation action in response to detecting the difference.

11. The method of claim 8, further comprising:
    deleting the first SBOM from the database; and
    storing the second SBOM in place of the first SBOM in the database.

12. The method of claim 1, further comprising:
    receiving an identifier of a software component;
    generating a query based on the received identifier; and
    executing the generated query on the database.

13. A non-transitory computer-readable medium storing a set of instructions for agentless generation of a software bill of materials (SBOM) in a computing environment, the set of instructions comprising:

one or more instructions that, when executed by one or more processors of a device, cause the device to:
generate an inspectable disk based on a disk deployed in a computing environment;
inspect the inspectable disk for a software component;
detect the software component in the inspectable disk;
generate an SBOM based on the detected software component; and
store the SBOM in a database.

14. A system for agentless generation of a software bill of materials (SBOM) in a computing environment comprising:
a processing circuitry;
a memory, the memory containing instructions that, when executed by the processing circuitry, configure the system to:
generate an inspectable disk based on a disk deployed in a computing environment;
inspect the inspectable disk for a software component;
detect the software component in the inspectable disk;
generate an SBOM based on the detected software component; and
store the SBOM in a database.

15. The system of claim 14, wherein the memory contains further instructions which when executed by the processing circuitry further configure the system to:
detect a cloud service in the computing environment, wherein the computing environment is a cloud computing environment; and
store an identifier of the cloud service in the SBOM.

16. The system of claim 14, wherein the memory contains further instructions which when executed by the processing circuitry further configure the system to:
detect a workload associated with the disk in the computing environment.

17. The system of claim 14, wherein the memory contains further instructions which when executed by the processing circuitry further configure the system to:
generate the inspectable disk by cloning the disk deployed in the computing environment.

18. The system of claim 14, wherein the memory contains further instructions which when executed by the processing circuitry further configure the system to:
generate the inspectable disk based on a snapshot of the disk.

19. The system of claim 14, wherein the memory contains further instructions which when executed by the processing circuitry further configure the system to:
generate the inspectable disk based on a copy of the disk.

20. The system of claim 14, wherein the software component is any one of:
a software application, a library, a binary, a dependency, a version setting, a registry file, a license, a vendor identifier, and any combination thereof.

21. The system of claim 14, wherein the memory contains further instructions which when executed by the processing circuitry further configure the system to:
generate a first SBOM at a first time; and
generate a second SBOM at a second time.

22. The system of claim 21, wherein the memory contains further instructions which when executed by the processing circuitry further configure the system to:
detect a difference between the second SBOM and the first SBOM; and
store the first SBOM and the detected difference in the database.

23. The system of claim 22, wherein the memory contains further instructions which when executed by the processing circuitry further configure the system to:
initiate a mitigation action in response to detecting the difference.

24. The system of claim 21, wherein the memory contains further instructions which when executed by the processing circuitry further configure the system to:
delete the first SBOM from the database; and
store the second SBOM in place of the first SBOM in the database.

25. The system of claim 14, wherein the memory contains further instructions which when executed by the processing circuitry further configure the system to:
receive an identifier of a software component;
generate a query based on the received identifier; and
execute the generated query on the database.

* * * * *